US008154823B2

(12) United States Patent
Saga et al.

(10) Patent No.: US 8,154,823 B2
(45) Date of Patent: Apr. 10, 2012

(54) INFORMATION RECORDING AND REPRODUCING APPARATUS, INFORMATION RECORDING AND REPRODUCING SYSTEM, INFORMATION PROCESSING APPARATUS AND INFORMATION REPRODUCING APPARATUS

(75) Inventors: Hideki Saga, Koganei (JP); Masaki Nagashima, Monterey, CA (US)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 12/486,014

(22) Filed: Jun. 17, 2009

(65) Prior Publication Data

US 2010/0053798 A1    Mar. 4, 2010

(30) Foreign Application Priority Data

Sep. 1, 2008  (JP) ................................. 2008-223330

(51) Int. Cl.
*G11B 5/596* (2006.01)

(52) U.S. Cl. ........... 360/78.05; 360/62; 360/70; 360/75; 360/77.02; 360/78.12

(58) Field of Classification Search ........................ None
See application file for complete search history.

(56) References Cited

U.S. PATENT DOCUMENTS

| 4,736,353 | A  | * | 4/1988  | Kasai et al. ................. 369/30.15 |
| 5,574,881 | A  |   | 11/1996 | Yasuoka et al. |
| 5,805,386 | A  | * | 9/1998  | Faris ........................... 360/264.4 |
| 6,384,998 | B1 | * | 5/2002  | Price et al. ........................ 360/51 |
| 6,437,937 | B1 | * | 8/2002  | Guo et al. .................. 360/78.05 |
| 6,577,464 | B2 | * | 6/2003  | Nakagawa ........................ 360/62 |
| 6,707,633 | B2 | * | 3/2004  | Okuyama et al. ............... 360/75 |
| 6,724,563 | B2 | * | 4/2004  | Kobayashi et al. ........ 360/78.05 |
| 6,747,836 | B2 | * | 6/2004  | Stevens et al. ............. 360/78.05 |
| 6,765,743 | B2 | * | 7/2004  | Goodman et al. .............. 360/75 |
| 7,027,253 | B1 | * | 4/2006  | Sun et al. ......................... 360/75 |
| 7,031,099 | B2 | * | 4/2006  | Kohso et al. ............... 360/78.05 |
| 7,035,972 | B2 |   | 4/2006  | Guha et al. |
| 7,324,301 | B2 | * | 1/2008  | Tormasi ..................... 360/78.12 |
| 2003/0058558 | A1 | * | 3/2003  | Ottesen et al. .................. 360/31 |
| 2004/0075925 | A1 | * | 4/2004  | Gong et al. ..................... 360/31 |

OTHER PUBLICATIONS

American National Standard for Information Technology—AT Attachment with Packet Interface—7 (ATA/ATAPI-7) Specifications ANSI INCITS 397-2005.
Information Explosion, Latanya Sweeney, School of Computer Science, Carnegie Mellon University, Pittsburgh, PA USA 2001.

* cited by examiner

*Primary Examiner* — Dismery Mercedes
(74) *Attorney, Agent, or Firm* — Antonelli, Terry, Stout & Kraus, LLP.

(57) ABSTRACT

An information recording and reproducing apparatus 1 having a high efficiency of information transfer includes one or more recording media forming a plurality of recording surfaces, a plurality of heads respectively disposed on the recording surfaces, a first actuator for supporting the heads and moving the heads uniformly, a plurality of second actuators provided one for an associated one of the heads, the second actuators moving the heads independently relative to the first actuator, recording processing circuits for simultaneously outputting recording signals, and reproducing processing circuits simultaneously supplied with reproduced signals read out by the heads to reproduce information from the reproduced signals.

18 Claims, 11 Drawing Sheets

FIG. 6A

REGISTER MAP

| ADDRESS LINE STATE | | | | | READ | | WRITE | |
|---|---|---|---|---|---|---|---|---|
| CS0- | CS1- | DA2 | DA1 | DA0 | HOB=0 | HOB=1 | MOST RECENTLY WRITTEN | PREVIOUS CONTENT |
| 0 | 1 | 0 | 0 | 0 | DATA | | DATA | |
| 0 | 1 | 0 | 0 | 1 | ERROR | | FEATURES | |
| 0 | 1 | 0 | 1 | 0 | SECTOR COUNT(7:0) | SECTOR COUNT(15:8) | COUNT(7:0) | SECTOR COUNT(15:8) |
| 0 | 1 | 0 | 1 | 1 | LBA(7:0) | LBA(31:24) | LBA(7:0) | LBA(31:24) |
| 0 | 1 | 1 | 0 | 0 | LBA(15:8) | LBA(39:32) | LBA(15:8) | LBA(39:32) |
| 0 | 1 | 1 | 0 | 1 | LBA(23:16) | LBA(47:40) | LBA(23:16) | LBA(47:40) |
| 0 | 1 | 1 | 1 | 0 | DEVICE | | DEVICE | |
| 0 | 1 | 1 | 1 | 1 | STATUS | | COMMAND | |
| 1 | 0 | 1 | 1 | 0 | ALTERNATIVE STATUS | | DEVICE CONTROL | |
| 1 | 0 | 1 | 1 | 1 | | | RESERVED | |

FIG. 6B

DEVICE REGISTER MAP

| BIT 7 | BIT 6 | BIT 5 | BIT 4 | BIT 3 | BIT 2 | BIT 1 | BIT 0 |
|---|---|---|---|---|---|---|---|
| OBSOLETE | DEPEND ON COMMAND | OBSOLETE | DEVICE SELECT (DEV) | DEPEND ON COMMAND | DEPEND ON COMMAND | DEPEND ON COMMAND | DEPEND ON COMMAND |

FIG. 6C

STATUS REGISTER/ALTERNATIVE REGISTER MAP

| BIT 7 | BIT 6 | BIT 5 | BIT 4 | BIT 3 | BIT 2 | BIT 1 | BIT 0 |
|---|---|---|---|---|---|---|---|
| BUSY | DEVICE READY (DRDY) | DEVICE FAULT /STREAM ERROR (DF/SE) | DEPEND ON COMMAND | DATA REQUEST (DRQ) | OBSOLETE | OBSOLETE | ERROR/CHECK (ERR/CHK) |

FIG. 6D

DEVICE CONTROL REGISTER MAP

| BIT 7 | BIT 6 | BIT 5 | BIT 4 | BIT 3 | BIT 2 | BIT 1 | BIT 0 |
|---|---|---|---|---|---|---|---|
| HIGH ORDER BYTE (HOB) | RESERVED | RESERVED | RESERVED | RESERVED | SOFTWARE RESET (SRST) | INTERRUPT ENABLED (nIEN) | 0 |

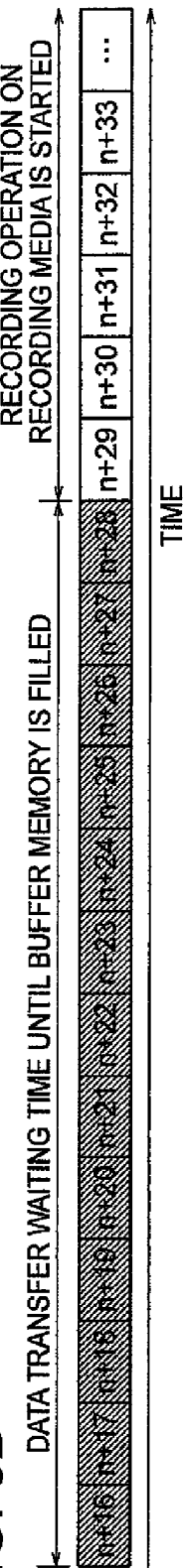

FIG. 10

| FUNCTION | FUNCTION BLOCK | CONVENTIONAL ART | PRESENT EMBODIMENT |
|---|---|---|---|
| HEAD POSITIONING | FINE ADJUSTMENT ACTUATOR POSITIONING PROCESSING/DRIVE | n | n |
| | VCM CONTROL PROCESSING/DRIVE | n | |
| | SPM CONTROL PROCESSING/DRIVE | n | |
| RECORDING MEDIA ROTATION | RECORDING/REPRODUCING SIGNAL PROCESSING | n | n |
| RECORDING AND REPRODUCING | BUFFER MEMORY CONTROL PROCESSING | n | n |
| HOST INTERFACE | DATA DISTRIBUTION/ALIGNMENT PROCESSING | n | |
| | COMMAND PROCESSING | n | n |
| | DATA TRANSFER PROCESSING | n | n |

FIG. 11

| FUNCTION | FUNCTION BLOCK | CONVENTIONAL ART | PRESENT EMBODIMENT |
|---|---|---|---|
| HEAD POSITIONING | FINE ADJUSTMENT ACTUATOR POSITIONING PROCESSING/DRIVE | 1 | n |
| | VCM CONTROL PROCESSING/DRIVE | 1 | 1 |
| RECORDING MEDIA ROTATION | SPM CONTROL PROCESSING | 1 | 1/n |
| | SPM DRIVE | 1 | n |
| RECORDING AND REPRODUCING | ANALOG SYSTEM RECORDING/ REPRODUCING SIGNAL PROCESSING | 1 | n |
| | DIGITAL SYSTEM RECORDING/ REPRODUCING SIGNAL PROCESSING | 1 | 1=(1/n) * n |
| | BUFFER MEMORY CONTROL PROCESSING | 1 | 1=n * (1/n) |
| | DATA DISTRIBUTION/ALIGNMENT PROCESSING | 0 | 1 |
| HOST INTERFACE | COMMAND PROCESSING | 1 | 1 |
| | DATA TRANSFER PROCESSING | 1 | 1 | ously outputting recording signals which represent information to be recorded on the predetermined tracks to the heads, and reproducing processing circuits simultaneously supplied with reproduced signals read out from the predetermined tracks by the heads, the reproducing processing circuits reproducing information from the reproduced signals.

INFORMATION RECORDING AND REPRODUCING APPARATUS, INFORMATION RECORDING AND REPRODUCING SYSTEM, INFORMATION PROCESSING APPARATUS AND INFORMATION REPRODUCING APPARATUS

INCORPORATION BY REFERENCE

The present application claims priority from Japanese application JP2008-223330 filed on Sep. 1, 2008, the content of which is hereby incorporated by reference into this application.

BACKGROUND OF THE INVENTION

The present invention relates to an information recording and reproducing apparatus, an information recording and reproducing system, an information processing apparatus and an information reproducing apparatus. In particular, the present invention relates to a technique for positioning a head by using a multi-stage actuator.

In recent years, the magnetic disc apparatus and the optical disc apparatus have been known as the information recording and reproducing apparatus. In such an information recording and reproducing apparatus, a plurality of recording surfaces in total are formed on one or more disc-shaped recording media. A head for reading and writing information is provided so as to be associated with each of the recording surfaces.

Taking a magnetic disc apparatus as am example, a plurality of heads are moved uniformly by an actuator such as a voice coil motor, and are caused to approach circular tracks), (so-called "cylinder") which are common in radius position among a plurality of circular tracks formed on recording surfaces of disc-shaped recording media.

Reference may be made to U.S. Pat. No. 7,035,972 (B2), Method and apparatus for power-efficient high-capacity scalable storage system.

SUMMARY OF THE INVENTION

Circular tracks formed on the recording surfaces have individually different distortions from their ideal tracks of circle. In the above-described actuator, therefore, all heads cannot be positioned simultaneously on the circular tracks of the recording surfaces. In a state in which one of the heads is positioned on a circular track, therefore, information reading and writing are conducted by this head and remaining heads are not used during that time.

Thus, in the conventional information recording and reproducing apparatus, only one head is used at a time even if heads are provided one for an associated one of a plurality of recording surfaces.

The present invention has been made in view of these circumstances, and the present invention provides an information recording and reproducing apparatus, an information recording and reproducing system, an information processing apparatus and an information reproducing apparatus capable of raising the efficiency of information transfer.

An information recording and reproducing apparatus according to one aspect of the present invention includes one or more recording media having information recorded on predetermined tracks formed on each of a plurality of recording surfaces, a plurality of heads provided one for a corresponding one of the recording surfaces, the heads relatively moving in directions along the predetermined tracks, a first actuator for supporting the heads and moving the heads uniformly, the first actuator causing the heads to approach the predetermined tracks, a plurality of second actuators provided, one for a corresponding one of the heads, the second actuators moving the heads independently relative to the first actuator, the second actuators suppressing deviations of the heads from the predetermined tracks, recording processing circuits for simultane In one embodiment of the present invention, the first actuator causes the heads to approach the predetermined tracks on the basis of an average deviation of the heads.

In one embodiment of the present invention, a spindle motor which rotates the recording media each formed in a disc shape around a common rotation shaft is further included.

In one embodiment of the present invention, a plurality of circular tracks are formed around the rotation shaft on the recording surfaces of the recording media formed in a disc shape, and those circular tracks formed on the recording surfaces that are common in radius position are used as the predetermined tracks.

In one embodiment of the present invention, a plurality of circular tracks are formed around the rotation shaft on the recording surfaces of the recording media formed in a disc shape, and servo information is recorded at a common circumferential position on the circular tracks formed on the recording surfaces.

In one embodiment of the present invention, the recording processing circuits distribute information units which are successively input, to the heads by a predetermined number which is less than the number of recording units forming each of the predetermined tracks.

In one embodiment of the present invention, the recording processing circuits distribute information units which are associated with serial numbers and which are input in order of the serial number, to the heads by a predetermined number which has consecutive serial numbers and which is less than the number of recording units forming each of the predetermined tracks.

In one embodiment of the present invention, whenever the heads read out information units from a predetermined number of consecutive recording units among the recording units forming each of the predetermined tracks, where the predetermined number is less than the number of recording units forming each of the predetermined tracks, the reproducing processing circuits rearrange the information units in order of serial numbers associated with the information units and output the rearranged information units.

In one embodiment of the present invention, recording units forming the predetermined tracks are divided into sets in which recording units approached simultaneously by the heads continue by a predetermined number less than the number of recording units forming each of the predetermined tracks, and a plurality of recording units belonging to each of the sets are associated with serial numbers each representing a recording position of an information unit, in order of the serial number.

In this embodiment, a temporary storage unit capable of storing at least $(c-1) \times d + 1$ information units, where c is the total number of the heads and d is the predetermined number, may be further included.

In one embodiment of the present invention, information units associated with serial numbers are rearranged to a sequence of sets of information units to be recorded in recording units approached simultaneously by the heads among recording units forming the predetermined tracks, and input from an external apparatus, and the recording processing circuits distribute the information units which are input as the sequence of sets, to the heads.

In one embodiment of the present invention, the reproducing processing circuits output information units successively read out from recording units forming each of the predetermined tracks by the heads to an external apparatus, and the external apparatus rearranges the information units in order of serial numbers associated with the information units.

In this mode, a temporary storage unit capable of storing at least c information units, where c is the total number of the heads may be further included.

An information recording and reproducing system according to another aspect of the present invention includes an information recording and reproducing apparatus which includes one or more recording media having information recorded on predetermined tracks formed on each of a plurality of recording surfaces, a plurality of heads provided one for an associated one of the recording surfaces, the heads relatively moving in directions along the predetermined tracks, a first actuator for supporting the heads and moving the heads uniformly, the first actuator causing the heads to approach the predetermined tracks, a plurality of second actuators provided one for an associated one of the heads, the second actuators moving the heads independently relative to the first actuator, the second actuators suppressing deviations of the heads from the predetermined tracks, recording processing circuits for simultaneously outputting recording signals which represent information to be recorded on the predetermined tracks to the heads, and reproducing processing circuits simultaneously supplied with reproduced signals read out from the predetermined tracks by the heads, the reproducing processing circuits reproducing information from the reproduced signals, and an information processing apparatus for transmitting information to be recorded on the recording media to the information recording and reproducing apparatus and receiving information reproduced from the recording media from the information recording and reproducing apparatus. The information processing apparatus rearranges information units associated with serial numbers to a sequence of sets of information units to be recorded in recording units approached simultaneously by the heads among recording units forming the predetermined tracks, and transmits the rearranged information units to the information recording and reproducing apparatus. The recording processing circuits in the information recording and reproducing apparatus distribute the information units which are input as the sequence of sets, to the heads.

In one embodiment of the present invention, the reproducing processing circuits in the information processing apparatus output information units successively read out from the recording units forming the predetermined tracks by the heads to the information processing apparatus, and the information processing apparatus rearranges the information units in order of serial numbers associated with the information units.

An information processing apparatus according to still another aspect of the present invention is provided for an information recording and reproducing apparatus. The information recording and reproducing apparatus includes one or more recording media having information recorded on predetermined tracks formed on each of a plurality of recording surfaces, a plurality of heads provided one for an associated one of the recording surfaces, the heads relatively moving in directions along the predetermined tracks, a first actuator for supporting the heads and moving the heads uniformly, the first actuator causing the heads to approach the predetermined tracks, a plurality of second actuators provided one for an associated one of the heads, the second actuators moving the heads independently relative to the first actuator, the second actuators suppressing deviations of the heads from the predetermined tracks, recording processing circuits for simultaneously outputting recording signals which represent information to be recorded on the predetermined tracks to the heads, and reproducing processing circuits simultaneously supplied with reproduced signals read out from the predetermined tracks by the heads, the reproducing processing circuits reproducing information from the reproduced signals. The information processing apparatus rearranges information units associated with serial numbers to a sequence of sets of information units to be recorded in recording units approached simultaneously by the heads among recording units forming the predetermined tracks, and transmits the rearranged information units to the information recording and reproducing apparatus.

In one embodiment of the present invention, the information processing apparatus receives information units successively read out from the recording units forming the predetermined tracks by the heads, and rearranges the information units in order of serial numbers associated with the information units.

An information reproducing apparatus according to yet another aspect of the present invention includes one or more recording media having information recorded on predetermined tracks formed on each of a plurality of recording surfaces, a plurality of heads provided one for an associated one of the recording surfaces, the heads relatively moving in directions along the predetermined tracks, a first actuator for supporting the heads and moving the heads uniformly, the first actuator causing the heads to approach the predetermined tracks, a plurality of second actuators provided one for an associated one of the heads, the second actuators moving the heads independently relative to the first actuator, the second actuators suppressing deviations of the heads from the predetermined tracks, and reproducing processing circuits simultaneously supplied with reproduced signals read out from the predetermined tracks by the heads, the reproducing processing circuits reproducing information from the reproduced signals.

According to the present invention, deviations of respective heads for respective predetermined tracks are suppressed independently by a plurality of second actuators provided, one for an associated one of the respective heads. Therefore, information can be read and written by a plurality of heads simultaneously. As a result, the efficiency of information transfer can be raised.

Other objects, features and advantages of the invention will become apparent from the following description of the embodiments of the invention taken in conjunction with the accompanying drawings.

BRIEF DESCRIPTION OF THE DRAWINGS

FIGS. 6A to 6D are exemplary diagrams for explaining a register function in the information recording and reproducing apparatus;

FIGS. 8A and 8B are exemplary diagrams for explaining a first example of data arrangement and data transfer in the information recording and reproducing apparatus;

FIG. 10 is an exemplary diagram showing a result obtained by comparing the present embodiment with a conventional art as regards a data processing quantity and a drive power quantity per unit time; and FIG. 11 is an exemplary diagram showing a result obtained by comparing the present embodiment with a conventional art as regards the data processing quantity and the drive power quantity per unit time.

DETAILED DESCRIPTION OF THE EMBODIMENTS

Embodiments of the present invention will be described with reference to the drawings.

Figure 1:
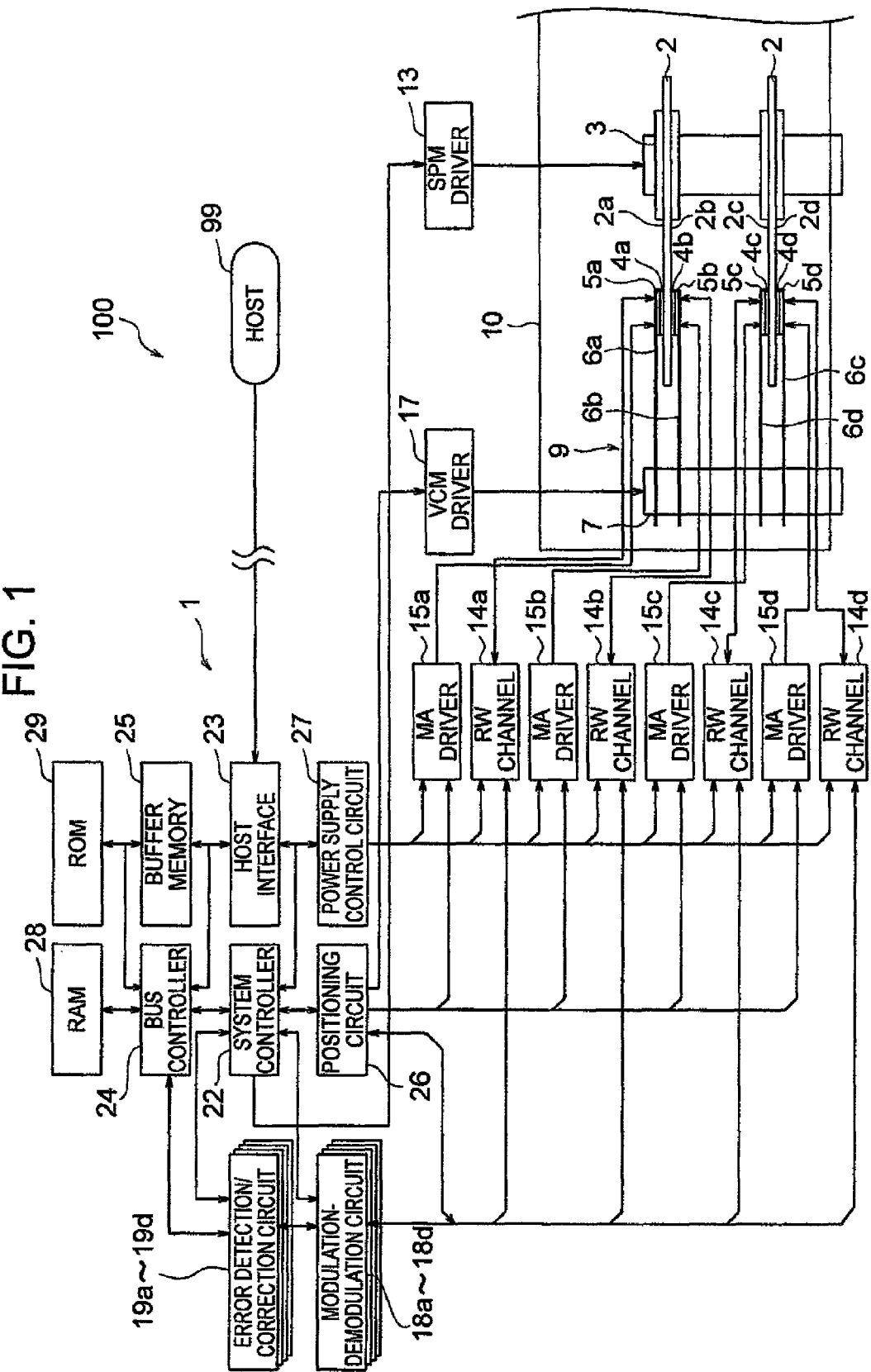
FIG. 1 is an exemplary diagram showing a configuration example of an information recording and reproducing apparatus as an example of an information recording and reproducing apparatus according to the present invention.

FIG. 1 is a diagram showing a configuration example of an information recording and reproducing apparatus according to the present invention. In the present embodiment, an information recording and reproducing apparatus 1 is formed as a magnetic disc apparatus. The information recording and reproducing apparatus 1 forms an information recording and reproducing system 100 in conjunction with a host 99, and conducts data recording and reproducing in response to a command from the host 99.

A plurality of disc-shaped recording media (magnetic disc media) 2 are housed in a casing 10 of the information recording and reproducing apparatus 1. Faces of these recording media 2 are used as recording surfaces 2a to 2d for recording data. In the present embodiment, two recording media 2 are housed in the casing 10 and a total of four recording surfaces 2a to 2d are formed. Note that the number of recording media 2 and the number of recording surfaces 2a to 2d are not restricted to them. For example, one recording medium having recording surfaces on both sides may be provided, or a plurality of recording media each having a recording surface on one side may be provided.

These recording media 2 are attached to a spindle motor (SPM) 3 provided on the bottom of the casing 10. The SPM 3 rotates the two recording media 2 with a common rotation shaft.

Figure 2:
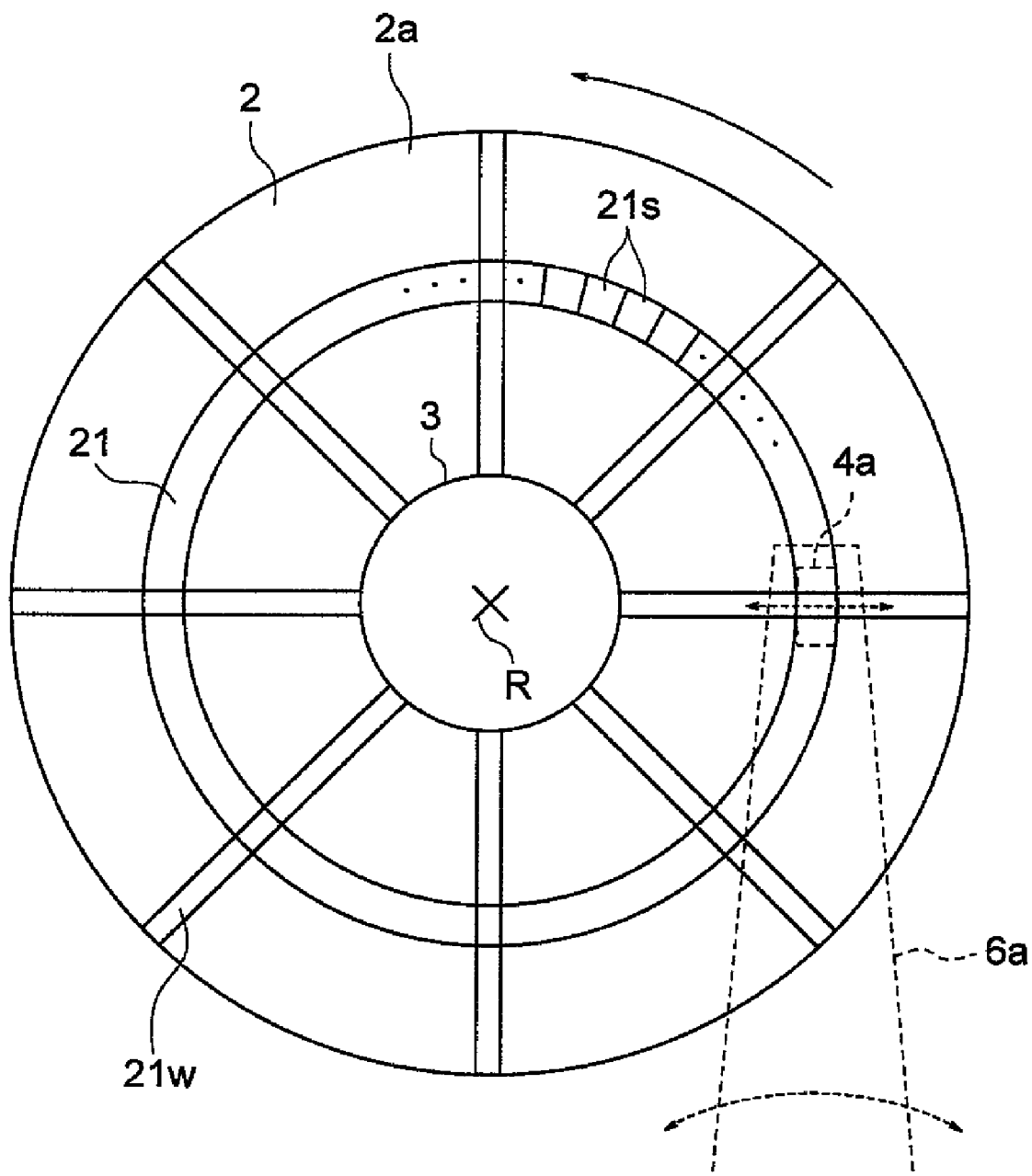
FIG. 2 is an exemplary diagram for explaining a recording medium.

FIG. 2 is a diagram for explaining the recording medium 2. In FIG. 2, the recording surface 2a is illustrated as a representative one. However, other recording surfaces 2b to 2d are formed in the same way. A plurality of cylindrical (circumferential) tracks 21 having a rotation shaft R in the center are recorded concentrically on each of the recording surfaces 2a to 2d. In FIG. 2, only one track 21 is enlarged and shown. On each track 21, servo data areas 21w arranged at predetermined periods are formed. These servo data areas 21w are formed in circumferential positions common to the recording surfaces 2a to 2d. Servo data including address information and a burst signal are recorded in these servo data areas 21w.

Each track 21 includes a plurality of sectors (recording units) 21s obtained by dividing the track every predetermined length along the circumferential direction. These sectors 21s are assigned sector numbers which are unique serial numbers as described later (the so-called LBA (Logic Block Address). Data access from the host 99 is conducted by taking a sector 21s as the unit.

Referring back to FIG. 1, a coarse adjustment actuator (first actuator) 9 which supports a plurality of magnetic head sliders 4a to 4d (hereafter referred to simply as "heads 4a to 4d") is provided in the casing 10 of the information recording and reproducing apparatus 1. The coarse adjustment actuator 9 includes a voice coil motor (VCM) 7 and a plurality of suspension arms 6a to 6d which extend from the VCM 7 to the recording media 2 in a comb teeth form. Heads 4a to 4d are supported respectively at tip parts of the suspension arms 6a to 6d. These heads 4a to 4d are disposed so as to be opposed respectively to the recording surfaces 2a to 2d of the recording media 2.

The VCM 7 causes uniform relative movement of the heads 4a to 4d substantially in the radius direction relative to the recording media 2 by driving the suspension arms 6a to 6d in the revolution direction. As a result, the heads 4a to 4d move in a direction (scanning direction) crossing the tracks formed on the recording surfaces 2a to 2d (see FIG. 2). Since the heads 4a to 4d are arranged so as to overlap one another in the vertical direction (a direction perpendicular to the recording surfaces 2a to 2d), the heads 4a to 4d assume the same circumferential position and radius position relative to the recording media 2. Furthermore, since the recording media 2 are rotated by the SPM 3, the heads 4a to 4d conduct relative movement in the direction along the circular tracks as well.

In addition, the heads 4a to 4d are attached to the suspension arms 6a to 6d via fine adjustment actuators (second actuators) 5a to 5d, respectively. The fine adjustment actuators 5a to 5d are formed of piezo actuators, and the fine adjustment actuators 5a to 5d cause independent relative movement of the heads 4a to 4d relative to the suspension arms 6a to 6d. As a result, the heads 4a to 4d move in a direction (scanning direction) crossing tracks formed on the recording surfaces 2a to 2d (see FIG. 2). Note that the fine adjustment actuators 5a to 5d are not restricted to the piezo actuators, but may be, for example, electrostatic actuators or magnetic force actuators.

Figure 3:
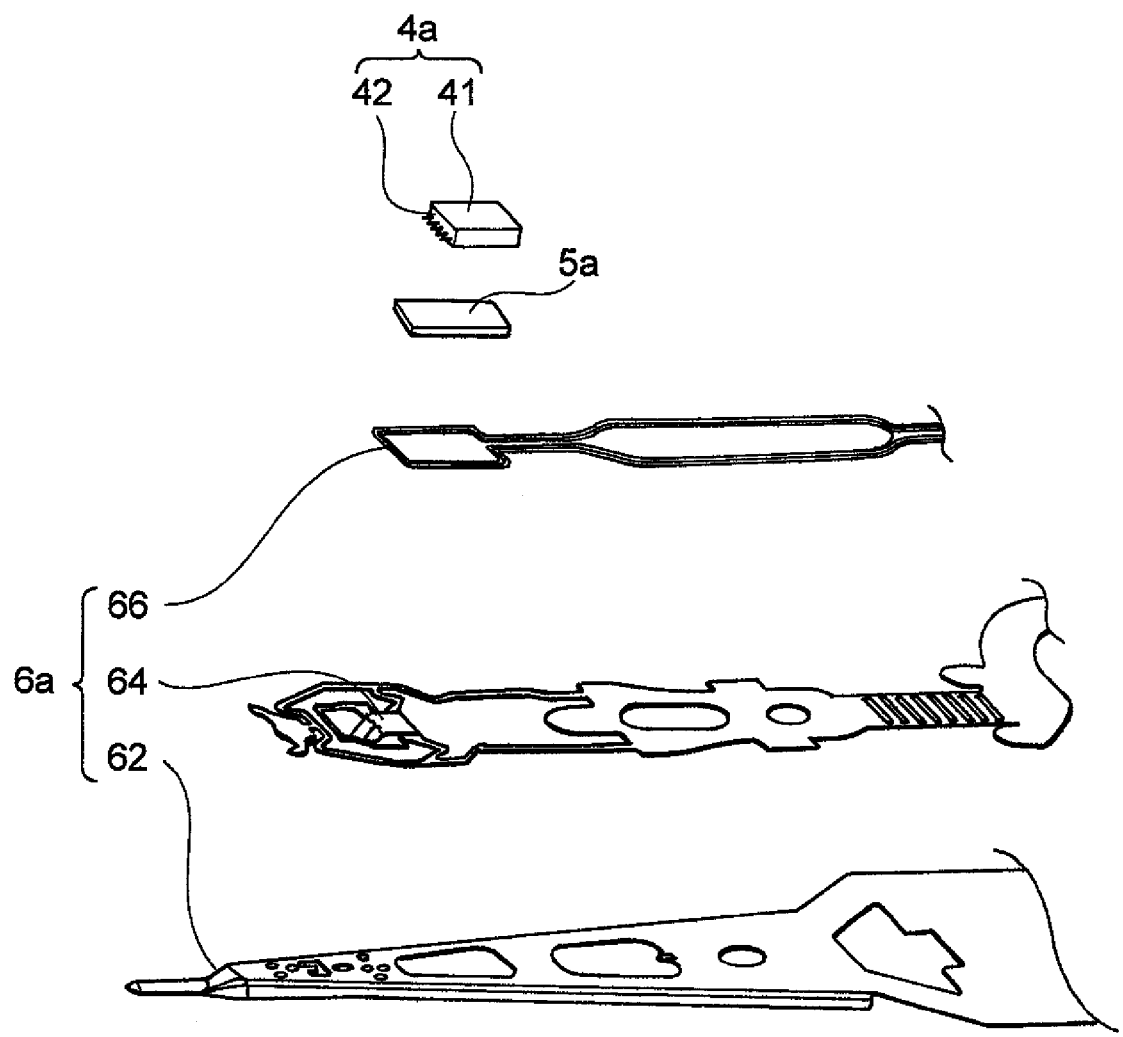
FIG. 3 is an exemplary exploded oblique view of a tip part of a suspension arm.

FIG. 3 is an exploded oblique view of the tip part of the suspension arm 6a. In FIG. 3, the suspension arm 6a is illustrated as a representative one. However, other suspension arms 6b to 6d are also formed in the same way. An arm main body 62 is a structure obtained by conducting press working on a thin stainless plate, and fixed to the VCM 7 at a base end side which is not illustrated (see FIG. 1). A flexure 64 formed of a thin stainless plate is fixed partially to the arm main body 62 by using spot welding or the like. The head 4a is attached to a tip part of the arm main body 62 via the fine adjustment actuator 5a. The head 4a has a head element part 42 including a recording element and a reproducing element on a tip side of a slider substrate 41. A first end of an FPC 66 is connected to the head element part 42 of the head 4a and the fine adjustment actuator 5a. A second end of the FPC 66 is connected to a circuit for controlling them, i.e., an RW channel 14a and an MA driver 15a shown in FIG. 1. Operation of them will be described in detail later.

In the present embodiment, a mode (the so-called slider drive type) in which the fine adjustment actuator 5a lies between the suspension arm 6a and the head 4a has been mentioned as an example. However, the present embodiment is not restricted to this. A fine adjustment actuator may be built in the head 4a as a MEMS (the so-called slider drive type). A fine adjustment actuator may be built in a node part obtained by dividing the arm main body 62 into two parts: a front part and a back part (the so-called suspension drive type).

Referring back to FIG. 1, a system controller 22 exercises general control on other function blocks in the information recording and reproducing apparatus 1 directly or indirectly to implement desired operation. The system controller 22 reads out a control program group for conducting various kinds of processing from a ROM 29 into a RAM 28 via a bus controller 24 and executes the control program group. The RAM 28 functions as a program work area. As a result, the system controller 22 executes positioning control and recording and reproducing control. In addition, the system controller 22 gives an order to an SPM driver 13, drives the SPM 3 in the casing 10, and rotates the recording media 2.

[Positioning Control]

Upon receiving a data access instruction issued by the host 99 via a host interface 23, the system controller 22 interprets this data access instruction, calculates a target track (predetermined track) on which the heads 4a to 4d should be positioned, and moves the heads 4a to 4d through a positioning circuit 26. Specifically, when reading data, the system controller 22 moves the heads 4a to 4d to position the reproducing element incorporated in each of the heads 4a to 4d in the center of each target track. On the other hand, when writing data, the system controller 22 moves the heads 4a to 4d so as to position the recording element incorporated in each of the heads 4a to 4d in the center of each target track. Here, it is supposed that target tracks on which the heads 4a to 4d should be positioned are tracks which are formed on the recording surfaces 2a to 2d of the recording media 2 and which have a common radius position (so-called cylinder).

The heads 4a to 4d read out servo data from the servo data areas 21w (see FIG. 2) formed on the recording surfaces 2a to 2d by using incorporated reproducing elements, respectively. These servo data are input respectively to read/write channels (RW channels) 14a to 14d, amplified therein, and then input to the positioning circuit 26. Since the two recording media 2 are rotated by one SPM 3 and the servo areas 21w are formed in the common circumferential position on the recording surfaces 2b to 2d, timing for extracting servo data from reproducing signals read out by the heads 4a to 4d can be made the same.

The positioning circuit 26 controls the VCM 7 through a VCM driver 17 on the basis of these servo data, and thereby causes the heads 4a to 4d supported respectively at the tip parts of the suspension arms 6a to 6d to uniformly move and approach respective target tracks. Furthermore, the positioning circuit 26 adjusts the fine adjustment actuators 5a to 5d respectively through MA drivers 15a to 15d on the basis of respective servo data, and thereby suppresses deviations of the heads 4a to 4d from respective target tracks.

In this way, while the heads 4a to 4d are caused to approach the target tracks on the recording surfaces 2a to 2d under the control of the VCM 7, deviations of the heads 4a to 4d from the respective target tracks are suppressed under the control of the fine adjustment actuators 5a to 5d. As a result, the heads 4a to 4d can be positioned simultaneously on the target tracks on the recording surfaces 2a to 2d, respectively. Since the stroke of the fine adjustment actuators 5a to 5d is smaller than the stroke of the VCM 7, the number of tracks which can be scanned by the heads 4a to 4d is small. Furthermore, because of differences in stroke and load mass, power dissipated by the fine adjustment actuators 5a to 5d is extremely lower than that dissipated by the VCM 7.

Figure 4:
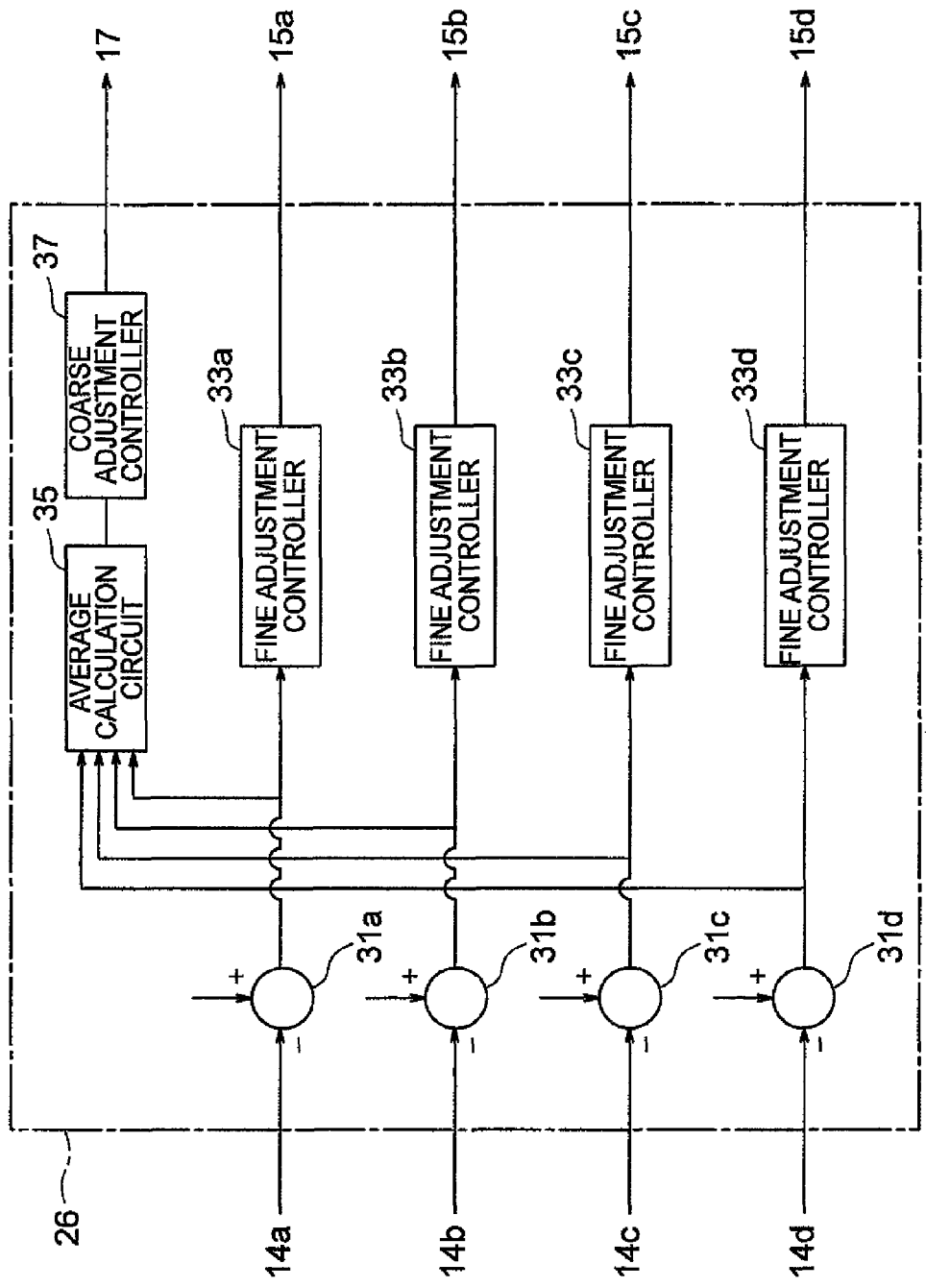
FIG. 4 is an exemplary block diagram showing a concrete function configuration example of a positioning circuit.

FIG. 4 is a block diagram showing a concrete function configuration example of the positioning circuit 26. From the viewpoint of function, the positioning circuit 26 includes position error calculation circuits 31a to 31d and fine adjustment controllers 33a to 33d provided so as to be respectively associated with the heads 4a to 4d, and includes an average calculation circuit 35 and a coarse adjustment controller 37. The position error calculation circuits 31a to 31d find differences between target tracks specified by the system controller 22 and current positions of the heads 4a to 4d discriminated from servo data which are input from the RW channels 14a to 14d, and calculates error signals (position error signals) which represent deviations of the heads 4a to 4d from the target tracks.

The position error signals output from the position error calculation circuits 31a to 31d are input to the fine adjustment controllers 33a to 33d, respectively. The fine adjustment controllers 33a to 33d generates control signals which suppress the deviations of the heads 4a to 4d from the target tracks, respectively and output the control signals to the fine adjustment actuators 5a to 5d via the MA drivers 15a to 15d. Furthermore, the position error signals which are output from the position error calculation circuits 31a to 31d are input to the average calculation circuit 35 as well. The average calculation circuit 35 calculates an average of the position error signals which are input, and the coarse adjustment controller 37 generates a control signal which suppresses the average, and outputs the control signal to the VCM 7 via the VCM driver 17. Calculation of the average position error is not restricted to the simple averaging, but, for example, weighted averaging or the like may be applied.

Figure 5:
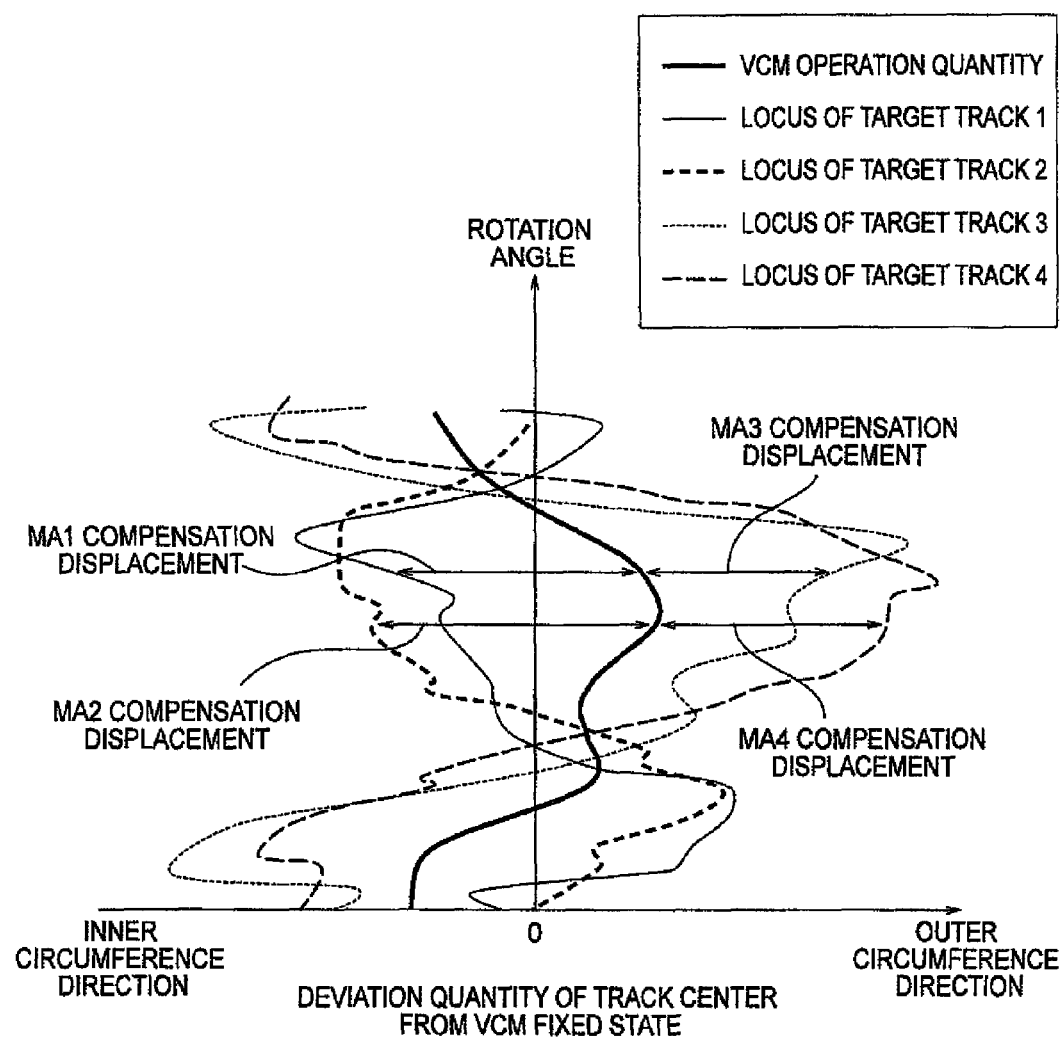
FIG. 5 is an exemplary diagram for explaining relations between operation quantities of a VCM and fine adjustment actuators and target tracks.

FIG. 5 is a diagram for explaining relations between operation quantities of the VCM 7 and the fine adjustment actuators 5a to 5d thus controlled and the target tracks. Its ordinate axis represents a rotation angle of the recording media 2, and its abscissa axis represents deviation quantities of the heads 4a to 4d from the target tracks 1 to 4 obtained when the VCM 7 is fixed. A 0 position on the abscissa axis corresponds to a fixed position of the VCM 7, and return positions of the fine adjustment actuators 5a to 5d obtained when the fine adjustment actuators 5a to 5d are brought into the free state (non-drive state).

Tracks formed on the recording surfaces 2a to 2d do not necessarily draw a true circle track because of position fluctuations of the heads caused when writing servo data, mechanical deformations of the recording media 2, or the like, but draw a slightly different track for every recording surface and for every track. Tracks of the target tracks 1 to 4 respectively on the recording surfaces 2a to 2d are shown in FIG. 5. The average calculation circuit 35 finds an average of deviation quantities of the heads 4a to 4d from the target tracks 1 to 4, and the coarse adjustment controller 37 controls the VCM 7 according to the average. The operation quantity of the VCM 7 at this time is represented as "VCM operation quantity" in FIG. 5. The fine adjustment controllers 33a to 33d control the fine adjustment actuators 5a to 5d respectively so as to compensate tracking residues generated because the respective target tracks 1 to 4 cannot be fully tracked even by the VCM 7, i.e., differences between the tracks of the target tracks 1 to 4 and the VCM operation quantities. Compensation displacements of the fine adjustment actuators 5a to 5d at this time are represented as "MA compensation displacements" in FIG. 5. The compensation displacements (MA compensation displacements) of the fine adjustment actuators 5a to 5d can be reduced as a whole by thus controlling the VCM 7 on the basis of the average of the deviation quantities of the heads 4a to 4d from the target tracks 1 to 4.

[Recording and Reproducing Control]

In the present embodiment, a circuit which forms a path from the host 99 to the heads 4a to 4d, i.e., a circuit group including the host interface 23, the bus controller 24, error detection/correction circuits 19a to 19d, modulation-demodulation circuits 18a to 18d, the RW channels 14a to 14d, and the system controller 22 which exercises general control on these circuits functions as a recording processing circuit and a reproducing processing circuit.

When recording data on the recording media 2 in accordance with a data access instruction issued by the host 99, data sent from the host 99 are temporarily stored in a buffer memory (temporary storage) 25 through the host interface 23 and the bus controller 24. The data stored in the buffer memory 25 are distributed to the error detection/correction circuits 19a to 19d through the bus controller 24. Here, the data stored in the buffer memory 25 are distributed to the error detection/correction circuits 19a to 19d in accordance with predetermined conditions every data unit (details will be described later).

The error detection/correction circuits 19a to 19d provide the input data with ECC data to be used for error detection and error correction at the time of reproducing, and send resultant data to the modulation-demodulation circuits 18a to 18d. The modulation-demodulation circuits 18a to 18d conduct predetermined modulation processing on the input data and send resultant data to the RW channels 14a to 14d. The RW channels 14a to 14d convert data which are input thereto to recording signals, and send the recording signals to the heads 4a to 4d. Thereby, the RW channels 14a to 14d drive the recording elements incorporated in the heads 4a to 4d and form local inverted magnetic domain distribution on the target tracks on the recording surfaces 2a to 2d. Thus, the RW channels 14a to 14d record data sent from the host 99. The RW channels 14a to 14d output the recording signals to the heads 4a to 4d simultaneously and thereby cause data from the heads 4a to 4d to be simultaneously recorded on the target tracks on the recording surfaces 2a to 2d.

On the other hand, when reproducing data from the recording media 2 in accordance with the data access instruction issued by the host 99, the data represented as the local inverted magnetic domain distribution on the target tracks on the recording surfaces 2a to 2d are read out as reproduced signals by the reproducing elements incorporated in the heads 4a to 4d, and are simultaneously input to the RW channels 14a to 14d, respectively. The RW channels 14a to 14d amplify the reproduced signals to desired signal strength and output resultant signals to the modulation-demodulation circuits 18a to 18d. The modulation-demodulation circuits 18a to 18d conduct demodulation, which is reverse processing of predetermined modulation processing conducted at the time of recording, and send the demodulated data to the error detection/correction circuits 19a to 19d. The error detection/correction circuits 19a to 19d conduct error detection and error correction processing on the demodulated data. Data obtained as a result are temporarily stored in the buffer memory 25 through the bus controller 24.

The bus controller 24 stores the data sent from the error detection/correction circuits 19a to 19d into the buffer memory 25 while rearranging the data in a predetermined order every data unit (details will be described later). As soon as a predetermined amount of data are stored in the buffer memory 25 and the host interface 23 and the host are ready, the data are sent out to the external host 99 via the bus controller 24 and the host interface 23.

In the present embodiment, as many error detection/correction circuits 19a to 19d and modulation-demodulation circuits 18a to 18d as the number of the RW channels 14a to 14d (four, a pair of a read channel and a write channel is counted as one channel) are provided. And paths leading from the error detection/correction circuits 19a to 19d to the RW channels 14a to 14d via the modulation-demodulation circuits 18a to 18d are capable of operating in parallel. However, the present embodiment is not restricted to this form, but it is possible to provide one error detection/correction circuit and one modulation-demodulation circuit and cause them to conduct time-division operation which is as high in speed as the number of the RW channels 14a to 14d. In either case, the data processing quantity or data computation quantity of the circuit per unit time becomes equal.

In the operation heretofore described, the system controller 22 monitors the operation situation of each function block and information retained by each function block, controls supply of power to respective function blocks such as the MA drivers 15a to 15d and the RW channels 14a to 14d through a power supply control circuit 27 and controls the number of channels which operate in parallel, in accordance with an explicit request from the host 99 or a predetermined condition decision procedure.

FIGS. 6A to 6D are diagrams for explaining a register function in the information recording and reproducing apparatus 1. FIG. 6A is a list of registers in the information recording and reproducing apparatus which can be accessed from the external. When the host 99 accesses the register group, the host 99 specifies access objects by using five parallel transmission address lines, i.e., CS0-, CS1-, DA2, DA1 and DA0. In addition, the host 99 orders access operation contents such as writing or reading, or uses a plurality of control lines (not illustrated) to specify an access data width. Connections between the host 99 and the host interface 23, control methods of respective signal lines, and a basic access method using them are based on a parallel ATA standard in American National Standard for Information Technology—AT Attachment with Packet Interface-7 (ATA/ATAPI-7) specifications ANSI INCITS 397-2005 drawn up by the American National Standards Institute (ANSI). Since details are described in the standards in detail, the entire disclosure of which is hereby incorporated by reference herein and detailed description will be omitted here.

FIG. 6B shows bit function assignment in a device register. A bit 4 (DEV) is a device for selecting a desired one from a maximum two information recording-reproducing apparatuses having a possibility of being connected to an interface bus of the host 99. FIG. 6C shows bit function assignment in a status register and an alternative status register. A bit 7 (BSY) indicates by "1" that the information recording and reproducing apparatus is conducting some processing. A bit 6 (DRDY) indicates an acceptance permission of an ordinary command by "1". A bit 5 (DF/SE) indicates some failure or the like other than errors in the device processing by "1." A bit 3 (DRQ) indicates that data to be transferred between the host 99 and the information recording and reproducing apparatus exist by "1." A bit 0 (ERR/CHK) indicates that an error has occurred in processing of a command issued immediately before, by "1."

FIG. 6D shows bit function assignment in a device control register. A bit 7 (HOB) specifies a function of a register capable of reading out a plurality of values (for example, readout changeover of LBA (7:0) and LBA (31:24). The bit 7 is cleared by writing into a command register or writing a value with the bit 7 (HOB) set equal to "0" into the device control register. The bit 7 is set by writing a value with the bit 7 (HOB) set equal to "1" into the device control register, and it becomes possible to read out a desired value from a register from which a plurality of values can be read out. A bit 2 (SRST) in the device control register is a bit for ordering the information recording and reproducing apparatus to reset software. By writing "1", the information recording and reproducing apparatus executes the software reset. A bit 1 (nIEN) in the device control register is a bit for controlling whether to permit the information recording and reproducing apparatus to issue an interrupt request to the host. Only when the bit 1 has "0" written therein and the information recording and reproducing apparatus is selected, it becomes possible for the information recording and reproducing apparatus to issue an interrupt request as occasion demands. As shown in the Table, other bits are reserved bits or a "0" specified bit. When writing into the device control register, it is necessary to set other bits to "0" without fail.

Figure 7:
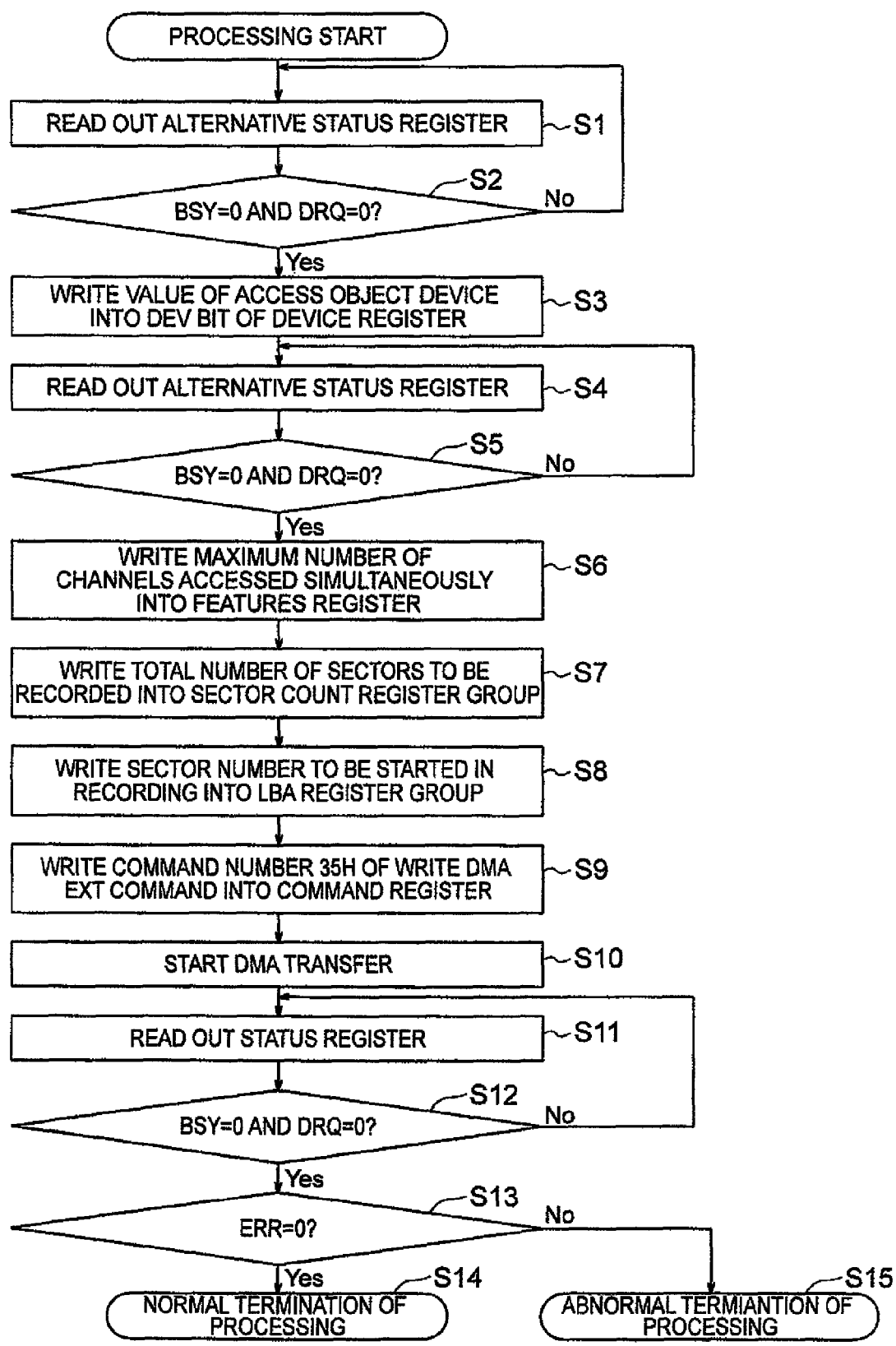
FIG. 7 is an exemplary diagram for explaining an example of a command issue method in the information recording and reproducing apparatus.

FIG. 7 is a diagram for explaining an example of a command issue method in the information recording and reproducing apparatus 1. As an example, the case where data retained by the host 99 is transferred to the information recording and reproducing apparatus 1 and recorded will now be described.

First, the host 99 operates the interface, and reads out the alternative status register (see FIG. 6C) in the information recording and reproducing apparatus 1 (S1). Until a BSY bit and a DRQ bit in the result read out become respectively "0" and "0", the host 99 repeats readout of the alternative status register and check and waits (S2). If the BSY bit and the DRQ bit in the result read out become respectively "0" and "0", then the host 99 writes a value which specifies an access object device into a DEV bit of the device register (see FIG. 6B), and conducts selection of the information recording and reproducing apparatus 1 (S3). Subsequently, the host 99 reads out the alternative status register again (S4). Until the BSY bit and the DRQ bit in the result read out become respectively "0" and "0", the host 99 repeats readout of the alternative status register and check and waits (S5). If the BSY bit and the DRQ bit become respectively "0" and "0" as a result of the readout and check, then the host 99 writes a maximum number of channels which are accessed simultaneously at the time of recording and reproducing into a function register (not illustrated) (S6).

In the above-described ANSI INCITS 397-2005 standards, contents to be written into the function register which are parameters of a WRITE DMA EXT command or the like have been reserved. In the present embodiment, however, the function of the register is redefined (expanded) and used. Since the function register has an 8-bit width, a writable value becomes an integer which is in the range of 0 to 255 in decimal number. However, a write value 0 means that the information recording and reproducing apparatus 1 dynamically determines the number of channels which are accessed simultaneously at the time of recording and reproducing. A write value 255 is a value reserved for the future expansion and it cannot be specified under the existing circumstances. In the case where the information recording and reproducing apparatus 1 dynamically conducts automatic determination of the number of channels which are accessed simultaneously at the time of recording and reproducing, the information recording and reproducing apparatus 1 refers to temporal issuance frequency of the access command and the data quantity subjected to the access request per unit time. As for the specification of the number of channels accessed simultaneously at the time of recording and reproducing by using a write value in the range of 1 to 254, the operation with the number of channels of the specified value is made the basis in the same way as the case of the above-described automatic determination. However, the number of channels in simultaneous operation can be reduced autonomously and temporarily with a specified value serving as an upper limit on the basis of the operation situation of the information recording and reproducing apparatus 1. These operations are supposed to be conducted in the case where simultaneous access becomes temporarily impossible because of a defect on the recording media 2 or large deviation of a track of a specific track from that of another track between the recording media 2.

In addition, the host 99 writes the number of sectors (16 bit value) of data to be recorded into a sector count register group (not illustrated) (S7), writes a sector number (48 bit value) to be started in recording into a LBA register group (S8), and finally writes a command number 35$h$ (hexadecimal notation) which means the WRITE DMA EXT command into the command register (S9). Subsequently to the command issuance, the host 99 starts sending of recording data using DMA transfer to the information recording and reproducing apparatus 1 (S10). Upon termination of the DMA transfer, the host 99 reads out the status register again (S11). The host 99 ascertains that the BSY bit, the DRQ bit and the ERR bit are "0" (S12 and S13), and terminates the recording processing started in response to the WRITE DMA EXT command (S14). If the ERR bit is "1" in this check, some error has occurred in the recording processing. Therefore, the host 99 regards the recording processing as being terminated abnormally, and starts analysis processing of error contents and error recovery processing (S15).

[First Example of Data Arrangement]

FIGS. 8A and 8B are diagrams for explaining a first example of data arrangement and data transfer in the information recording and reproducing apparatus 1. FIG. 8A schematically shows data arrangement on the recording media 2. In the present embodiment, four recording surfaces 2$a$ to 2$d$ are formed by the two recording media 2 and recording and reproducing are conducted by using the four heads 4$a$ to 4$d$ respectively associated with the recording surfaces 2$a$ to 2$d$. In other words, the maximum number of simultaneous accesses (=the number of heads=the number of channels) is set to c=4. For brevity, alternative sectors secured on recording media in the ordinary information recording and reproducing apparatus will not be considered.

A plurality of tracks arranged in a concentric circle form are formed on each of the recording surfaces 2$a$ to 2$d$ of the recording media 2. Among them, a cylinder number is assigned to tracks having a common radius position. Cylinder numbers ranging from 0 to a common maximum value are assigned in order from the outer circumference side of the recording surfaces 2$a$ to 2$d$. If the cylinder number is the same, the radius position on the recording surfaces 2$a$ to 2$d$ is common. The maximum value of the cylinder number depends upon a minimum radius, a maximum radius and a cylinder density per unit radius of recording areas of the recording surfaces 2$a$ to 2$d$.

Each cylinder is further differentiated by the heads 4$a$ to 4$d$ (differentiated by head number 0, 1, 2 and 3) used for recording and reproducing. It is possible to uniquely specify a track to be accessed by specifying a unique track number based on a cylinder number and a head number. Here, a value obtained by adding the head number to c times the cylinder number (where c=the maximum number of simultaneous accesses=the number of heads=the number of channels: in the present example c=4) is regarded as the track number.

Each track is equally divided into a predetermined number of sectors (recording units) in the circumferential direction. Each data unit (for example, 512 bytes) is recorded in a sector. In tracks 0 to 7 in an outermost part shown in FIG. 8A, each track is divided into n/4 sectors. In the present example, sector numbers assigned to respective sectors are not assigned in the order of number over one circumference of a track. A predetermined number d sector numbers are assigned to each of the four tracks in the same cylinder. In other words, sector numbers are assigned in the number order in a set of sectors which are consecutive by a predetermined number d and which are common in the radius position and circumferential position. Here, sectors which are common in the radius position and circumferential position are sectors which can be accessed simultaneously by the heads 4a to 4d.

Specifically, sector numbers are assigned to d sectors consecutively on a first track (for example, track: 0) beginning with a reference rotation angle position (0 degree position) of the recording media 2 (rotation angle range: 0 to 1440 d/n, sectors: 0 to 3). Subsequently, sector numbers are assigned to d sectors consecutively in the same rotation angle range of another track (track: 1) in the same cylinder (sectors: 4 to 7). Thus, sector numbers are assigned in the number order to 4d tracks existing in the predetermined rotation angle range (0 to 1440 d/n) in the same cylinder (sectors: 0 to 15). Thereafter, returning to the first track (track: 0) in the same cylinder, subsequent sector numbers (sectors: 16 to 19) are assigned to the next rotation angle range (1440 d/n to 2880 d/n). If sector numbers (sectors: 0 to n-1) have been assigned to the whole circumference of the same cylinder, then sector numbers (sectors: n to 2n-1) are assigned successively to the next cylinder in the same way.

The case where data units corresponding to n-16 sectors are to be recorded in a range of a sector n+16 to a sector 2n-1 will now be considered. In this case, the host 99 first issues a record command to the host interface 23 to record data. The record command is formed of information such as a record start sector number and a record data quantity of a sector unit. By the way, it is also possible to make the record command include the number c of channels which operate simultaneously at the time of recording and make the information recording and reproducing apparatus 1 control the number of channels which operate simultaneously in accordance with its specified value.

Subsequently, data units to be recorded are transferred from the host 99 in the order of the sector number such as n+16, n+17, n+18, n+19, n+20, n+21, n+22, n+23, n+24, . . . , and stored in the buffer memory 25. If storage of data units in the buffer memory 25 is continued and storage of the sector n+16 to sector n+28 is completed (in other words, the quantity of stored data units amounts to a quantity corresponding to (c−1)×d+1=13 sectors), then it is meant that data units to be recorded in head sectors among sectors to be recorded on respective tracks have been prepared, and data recording operation is started in accordance with the procedure described earlier. In parallel therewith, data units to be recorded are transferred consecutively from the host 99 to the host interface 23 and storage of data into the buffer memory 25 is continued.

FIG. 8B shows a transfer sequence of data units transferred on the host interface 23. The data units are stored in the buffer memory 25 in the order of the sector number in accordance with the transfer sequence on the host interface 23 represented as n+16, n+17, n+18, n+19, n+20, n+21, n+22, . . . . However, the bus controller 24 rearranges the sequence, and conducts operation of distributing data units to the heads 4a to 4d by d consecutive sector numbers so as to make the head 4a (head number 0) record data units of sectors n+16, n+17, n+18, n+19, . . . , 2n−16, 2n−15, 2n−14, 2n−13, make the head 4b (head number 1) record data units of sectors n+20, n+21, n+22, n+23, . . . , 2n−12, 2n−11, 2n−10, 2n−9, make the head 4c (head number 2) record data units of sectors n+24, n+25, n+26, n+27, . . . , 2n−8, 2n−7, 2n−6, 2n−5, and make the head 4d (head number 3) record data units of sectors n+28, n+29, n+30, n+31, . . . , 2n−4, 2n−3, 2n−2, 2n−1.

Thus, in the present example, the number of sectors over which sector numbers are assigned consecutively on one track is set equal to d (=4) which is less than the number (n/4) of sectors forming the track. Therefore, the time required until the start of the data record operation can be shortened and the capacity of the buffer memory 25 can be reduced. In other words, in the present example, data recording operation on the recording media 2 is started when data units corresponding to (c−1)×d+1 sectors are previously stored in the buffer memory 25. On the other hand, if the case where consecutive sector numbers are assigned over one track is supposed, the data recording operation on the recording media 2 cannot be started unless data corresponding to (c−1)×n/4+1 sectors are stored in the buffer memory 25.

According to the present example heretofore described, the sequence of data units transferred on the host interface 23 is made the same as the conventional sector number sequence. Owing to the simultaneous recording operation using a plurality of RW channels 14a to 14d, however, it becomes possible to raise the sequential data transfer speed. Furthermore, it is possible to suppress the data unit quantity to be previously transferred until the data recording operation is started to a comparatively small value corresponding to (c−1)×d+1 sectors. And it is possible to suppress the capacity of the buffer memory 25 to a comparatively small value corresponding to (c−1)×d+1 sectors at a minimum. Therefore, the data recording operation is started in a comparatively short time after the host 99 issues a record command and transfer of data to be recorded is started. As compared with the conventional information recording and reproducing apparatus in which only one channel operates exclusively, it becomes possible to suppress the degradation of access latency.

The case where data units corresponding to n−16 sectors recorded in a range of the sector n+16 to the sector 2n−1 are read out in the data arrangement shown in FIGS. 8A and 8B will now be described. In this case, the host 99 first issues a readout command to the host interface 23 to read out data. The readout command is formed of information such as a readout start sector number and a readout data quantity of a sector unit. By the way, it is also possible to make the readout command include the number c of channels which operate simultaneously at the time of readout and make the information recording and reproducing apparatus 1 control the number of channels which operate simultaneously in accordance with its specified value in the same way as the foregoing description.

As the recording media 2 rotate, the reproducing elements in the heads 4a to 4d arrive at head sectors (sectors n+16, n+20, n+24, n+28) included in sectors to be read out. Thereupon, the head 4a (head number 0) reads out data units from sectors n+16, n+17, n+18, n+19, n+32, n+33, n+34, n+35, . . . , 2n−16, 2n−15, 2n−14, 2n−13, and stores the data units in the buffer memory 25 in accordance with the above-described processing. At the same time, the head 4b (head number 1) reads out data units from sectors n+20, n+21, n+22, n+23, n+36, n+37, n+38, n+39, . . . , 2n−12, 2n−11, 2n−10, 2n−9, and stores the data units in the buffer memory 25. The head 4c (head number 2) reads out data units from sectors n+24, n+25, n+26, n+27, n+40, n+41, n+42, n+43, . . . , 2n−8, 2n−7, 2n−6, 2n−5, and stores the data units in the buffer memory 25. The head 4d (head number 3) reads out data units from sectors n+28, n+29, n+30, n+31, n+44, n+45, n+46, n+47, . . . , 2n−4, 2n−3, 2n−2, 2n−1, and stores the data units in the buffer memory 25.

At this time, the bus controller 24 conducts processing of rearranging data units read out from the sectors so as to transfer the data units read out from the sectors in the order of the sector number when transferring the data units from the host interface 23 to the host 99 later. In other words, each time each head reads out data units from d consecutive sectors on each track (i.e., each time a total of 4d data units are read out), the bus controller 24 rearranges the data units in the order of the sector number. In the present embodiment, immediately after the head 4a (head number 0) has read out data units from the sectors n+16, n+17, n+18, transfer of them is conducted intermittently. After the head 4a (head number 0) has read the sector n+19 thereafter, the data units n+19 to n+31 stored in the buffer memory 25 are transferred in the cited order. In other words, in the case of the present embodiment, it is necessary to store data units corresponding to (c−1)×d+1=13 sectors in the buffer memory 25, and the minimum capacity of the buffer memory 25 becomes a capacity corresponding to (c−1)×d+1=13 sectors.

Thus, in the present example, the number of sectors over which sector numbers are assigned consecutively on one track is set equal to d (=4) which is less than the number (n/4) of sectors forming the track. Therefore, the time required for the data read out to be transferred can be shortened and the capacity of the buffer memory 25 can be reduced. In other words, in the present example, data transfer from the buffer memory 25 to the host 99 is started when data units corresponding to (c−1)×d+1 sectors are stored in the buffer memory 25. On the other hand, if the case where consecutive sector numbers are assigned over one track is supposed, the data transfer from the buffer memory 25 to the host 99 cannot be started unless data corresponding to (c−1)×n/4+1 sectors are stored in the buffer memory 25.

According to the present example heretofore described, the sequence of data units transferred on the host interface 23 is made the same as the conventional sector number sequence. Owing to the simultaneous recording operation using a plurality of RW channels 14a to 14d, however, it becomes possible to raise the sequential data transfer speed. Furthermore, it is possible to suppress the capacity of the buffer memory 25 to a comparatively small value corresponding to (c−1)×d+1 sectors at a minimum. Therefore, data transfer is finished in a short time after the readout command is issued and data readout is started. As compared with the conventional information recording and reproducing apparatus in which only one channel operates exclusively, it becomes possible to suppress the degradation of access latency.

[Second Example of data Arrangement]

Figures 9A, 9B:
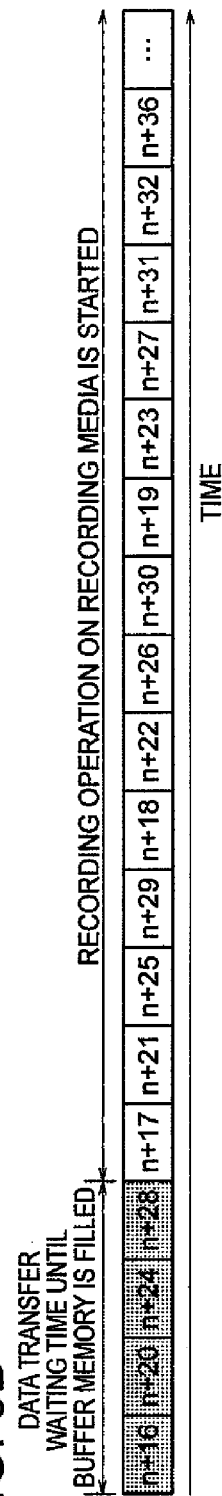
FIGS. 9A and 9B are exemplary diagrams for explaining a second example of data arrangement and data transfer in the information recording and reproducing apparatus.

FIGS. 9A and 9B are diagrams for explaining a second example of data arrangement and data transfer in the information recording and reproducing apparatus 1. FIG. 8A schematically shows data arrangement on the recording media 2. In the present example, sector numbers are assigned in the same way as the above-described first example. In the ensuing description, detailed description will be omitted as to places similar to those in the first example.

The case where data units corresponding to n−16 sectors are to be recorded in a range of a sector n+16 to a sector 2n−1 will now be considered. In the present example, the host 99 rearranges data units assigned sector numbers in the order of the number to a sequence of sets of data units to be recorded in sectors accessed simultaneously by the heads 4a to 4d, and then sends the rearranged data units to the host interface 23. In other words, data units to be recorded are transferred from the host 99 in the order of n+16, n+20, n+24, n+28, n+17, n+21, n+25, n+29, n+18, . . . , and are stored in the buffer memory 25. If storage of data units in the buffer memory 25 is continued and storage of the sector n+16 to the sectors n+20, n+24 and n+28 is completed (in other words, the quantity of stored data units amounts to a quantity corresponding to c=4 sectors), then it is meant that data units to be recorded in head sectors among sectors to be recorded on respective tracks have been prepared, and data recording operation is started in accordance with the procedure described earlier. In parallel therewith, data units to be recorded are transferred consecutively from the host 99 to the host interface 23 and storage of data into the buffer memory 25 is continued.

FIG. 9B shows a transfer sequence of data units transferred on the host interface 23. The data units are stored in the buffer memory 25 in accordance with the transfer sequence on the host interface 23 represented as n+16, n+20, n+24, n+28, n+17, n+21, n+25, n+29, n+18, n+22, n+26, n+30, . . . . However, the bus controller 24 conducts operation of distributing data units to the heads 4a to 4d so as to make the head 4a (head number 0) record data units of the sectors n+16, n+17, n+18, n+19, . . . , 2n−16, 2n−15, 2n−14, 2n−13, make the head 4b (head number 1) record data units of the sectors n+20, n+21, n+22, n+23, . . . , 2n−12, 2n−11, 2n−10, 2n−9, make the head 4c (head number 2) record data units of the sectors n+24, n+25, n+26, n+27, . . . , 2n−8, 2n−7, 2n−6, 2n−5, and make the head 4d (head number 3) record data units of the sectors n+28, n+29, n+30, n+31, . . . , 2n−4, 2n−3, 2n−2, 2n−1.

In the present example, the total number of sectors to be recorded by one command is a multiple of both n−16 and c=4. If the total number of sectors to be recorded is not a multiple of c, however, then the command may be regarded as completed after dummy data have been transferred so as to cause the total number of sectors of data transferred on the host interface 23 to become a minimum multiple of c exceeding the total number of sectors to be recorded, or the command may be regarded as completed immediately after the transfer completion of data corresponding to the total number of sectors to be recorded. Either will do.

Thus, in the present example, the host 99 rearranges data units to a sequence of sets of data units to be recorded in sectors accessed simultaneously by the heads 4a to 4d, then sends the rearranged data units to the host interface 23. Therefore, the time required until the data recording operation is started can be shortened and the capacity of the buffer memory 25 can be reduced. In other words, in the present example, data recording operation on the recording media 2 is started when data units corresponding to c sectors are previously stored. On the other hand, if the case where consecutive sector numbers are assigned over one track is supposed, the data recording operation on the recording media 2 cannot be started unless data corresponding to (c−1)×n/4+1 sectors are stored in the buffer memory 25.

According to the present example heretofore described, the host 99 changes the data sending sequence and the simultaneous recording operation using a plurality of RW channels 14a to 14d is conducted. As a result, it becomes possible to raise the sequential data transfer speed. Furthermore, it is possible to suppress the data unit quantity to be previously transferred until the data recording operation is started to a comparatively small value corresponding to c sectors. And it is possible to suppress the capacity of the buffer memory 25 to a comparatively small value corresponding to c sectors at a minimum. Therefore, the data recording operation is started in a comparatively short time after the host 99 issues a record command and transfer of data to be recorded is started. As compared with the conventional information recording and reproducing apparatus in which only one channel operates exclusively, it becomes possible to suppress the degradation of access latency.

The case where data units corresponding to n−16 sectors recorded in a range of the sector n+16 to the sector 2n−1 are reproduced in the data arrangement shown in FIGS. 9A and 9B will now be described. As the recording media 2 rotate, the reproducing elements in the heads 4a to 4d arrive at head sectors (sectors n+16, n+20, n+24, n+28) included in sectors to be read out. Thereupon, the head 4a (head number 0) reads out data units from sectors n+16, n+17, n+18, n+19, n+32, n+33, n+34, n+35, . . . , 2n−16, 2n−15, 2n−14, 2n−13, and stores the data units in the buffer memory 25 in accordance with the above-described processing. At the same time, the head 4b (head number 1) reads out data units from sectors n+20, n+21, n+22, n+23, n+36, n+37, n+38, n+39, . . . , 2n−12, 2n−11, 2n−10, 2n−9, and stores the data units in the buffer memory 25. The head 4c (head number 2) reads out data units from sectors n+24, n+25, n+26, n+27, n+40, n+41, n+42, n+43, . . . , 2n−8, 2n−7, 2n−6, 2n−5, and stores the data units in the buffer memory 25. The head 4d (head number 3) reads out data units from sectors n+28, n+29, n+30, n+31, n+44, n+45, n+46, n+47, . . . , 2n−4, 2n−3, 2n−2, 2n−1, and stores the data units in the buffer memory 25.

At this time, whenever the heads 4a to 4d read out data units from sectors on respective tracks (i.e., whenever a total of four data units are read out), the bus controller 24 transfers the data units from the host interface 23 to the host 99. In the present example, immediately after the head 4a (head number 0) has read out a data unit from the sector n+16, the head 4b (head number 1) has read out a data unit from the sector n+20, the head 4c (head number 2) has read out a data unit from the sector n+24, and the head 4d (head number 3) has read out a data unit from the sector n+28, the bus controller 24 transfers the data units from the host interface 23 to the host 99 in the order of the head number (i.e., in the order of n+16, n+20, n+24 and n+28). In other words, the data units are transferred to the host 99 in the same order as that shown in FIG. 9B. And the host 99 rearranges the data units in the order of the sector number.

Thus, in the present example, the host 99 rearranges data units in the order of the sector number. Therefore, the time required for the data read out to be transferred can be shortened and the capacity of the buffer memory 25 can be reduced. In other words, the information recording and reproducing apparatus 1 does not rearrange data units in the order of the sector number, but the host 99 rearranges data units in the order of the sector number. Owing to the simultaneous reproducing operation using a plurality of RW channels 14a to 14d, therefore, it becomes possible to raise the sequential data transfer speed.

In the first example and the second example, writing or reading are conducted simultaneously by using all of the four heads 4a to 4d. However, this is not restrictive, but a part (although it is a plurality) of the four heads 4a to 4d may be used to conduct simultaneously writing or reading. Even in this case, it can be considered that configurations meeting configurations according to claims are included in the information recording and reproducing apparatus 1. For example, when two heads among the four heads 4a to 4d are used, it can be considered that the information recording and reproducing apparatus 1 includes two recording surfaces, two heads and two second actuators and a configuration which conducts writing and reading simultaneously by using these two heads.

Finally, an approximate estimate of a power saving effect of the present embodiment heretofore described will now be described.

FIG. 10 is a diagram showing a result obtained by comparing the present embodiment heretofore described with a conventional art as regards data processing quantity and drive power quantity per unit time. Here, the conventional art is a system obtained by striping n conventional information recording and reproducing apparatuses which exclusively conducts processing of recording or reproducing with only one channel, by using an external controller.

The present embodiment differs from the conventional art in that the simultaneous recording operation or simultaneous reproducing operation is implemented in one information recording and reproducing apparatus and consequently the operation speed or the number of partial function blocks is increased to n times. Other basic specifications such as the number of heads and the number of recording media per information recording and reproducing apparatus, the recording density, physical dimensions of the recording media and the rotation speed of the recording media are the same. For brevity, it is now supposed that the power dissipation of semiconductors is proportional to only the product of the circuit scale (the number of gates) and the data processing quantity i.e., the computation quantity (operation frequency) per unit time and the effect of the leak current is negligibly small. In the ensuing description, the circuit scale, the data processing quantity per unit time, and power dissipation of each block in the conventional art are considered as criteria of magnification.

Among various kinds of processing concerning the magnetic head positioning, the data processing quantity per unit time required for positioning of the fine adjustment actuators becomes n times in the conventional art, because n information recording and reproducing apparatuses are used. In the present embodiment as well, the data processing quantity per unit time required for positioning of the fine adjustment actuators becomes n times, because n heads are positioned simultaneously. On the other hand, the data processing quantity per unit time required for positioning of the VCM becomes n times in the conventional art, because n information recording and reproducing apparatuses are used. On the other hand, in the present embodiment, the data processing quantity per unit time required for positioning of the VCM increases little and remains approximately one time, because only one VCM exists.

Among various kinds of processing concerning the rotation of the recording media, the data processing quantity per unit time required for the rotation control of the SPM becomes n times in the conventional art, because one information recording and reproducing apparatus is used. On the other hand, in the present embodiment, the data processing quantity per unit time required for the rotation control of the SPM increases little and remains approximately one time, because only one SPM exists.

Among various kinds of processing concerning the recording and reproducing signal processing, the data processing quantity per unit time in the RW channels, the modulation-demodulation circuits and the error detection/correction circuits becomes n times in both the conventional art and the present embodiment, because n channels operate simultaneously.

Among various kinds of processing concerning the periphery of the host interface, the data processing quantity per unit time required for the buffer memory control becomes n times in both the conventional art and the present embodiment, because the data transfer speed of a system is increased to n times as compared with one conventional information recording and reproducing apparatus. The data processing quantity per unit time concerning the data rearrangement becomes n times in both the conventional art and the present embodiment. Because the external controller processes a data transfer band of n times in the conventional art, whereas the bus controller processes a data transfer band of n times in the present embodiment. The data processing quantity per unit time required for processing of a command issued by the host becomes n times in the conventional art, because n interfaces are used. On the other hand, in the present embodiment, the data processing quantity per unit time required for processing of a command issued by the host remains approximately one time in the present embodiment, because the interface is limited to one. The data processing quantity per unit time required for transfer of data reproduced or to be recorded consequently becomes n times in the conventional art because of one time speed and n interfaces, whereas it becomes n times in the present embodiment as well because of n times speed and one interface.

Summarizing the foregoing description, therefore, the power dissipation is prevented in the present embodiment from increasing as regards items of the VCM control processing/drive, SPM control processing/drive and command processing. As regards the power dissipation, therefore, the present embodiment becomes advantageous over the conventional art. Besides, the number of drives can be reduced and inevitably the number of components included in the system can be reduced in the present embodiment as compared with the conventional art. In the present embodiment, therefore, it becomes possible to suppress the physical volume, weight and failure rate of the system. Furthermore, since the number of comparatively large movable parts such as the SPM and VCM is also suppressed, a secondary effect that generation of noise and vibration caused by these operations can be suppressed is brought about.

FIG. 11 is a diagram showing a result obtained by comparing the present embodiment with another conventional art as regards the data processing quantity and drive power quantity per unit time. Here, the conventional art is one conventional information recording and reproducing apparatus which exclusively conducts processing of recording or reproducing with only one channel.

The present embodiment differs from the conventional art in that the simultaneous recording operation or simultaneous reproducing operation is implemented in one information recording and reproducing apparatus and consequently the operation speed or the number of partial function blocks is increased to n times and the rotation speed of the recording media is changed to 1/n times. Other points are the same as those in the case of FIG. 10.

Among various kinds of processing concerning the magnetic head positioning, the data processing quantity per unit time required for positioning of the fine adjustment actuators in the present embodiment becomes n times as compared with the conventional art, because n heads are positioned simultaneously in the present embodiment. The data processing quantity per unit time required for positioning of the VCM differs little and remains approximately one time in both the conventional art and the present embodiment, because only one VCM exists.

Among various kinds of processing concerning the rotation of the recording media, the data processing quantity per unit time required for the rotation control of the SPM in the present embodiment becomes approximately 1/n times as compared with the conventional art, because the number of rotations of the SPM becomes 1/n in the present embodiment.

In addition, friction in the bearing part and friction between the recording media and the air in the present embodiment become $1/n^4$ as compared with the conventional art, because the frictions are proportional to approximately the fourth power of the rotation speed of the SPM in the present embodiment.

Among various kinds of processing concerning the recording and reproducing signal processing, the data processing quantity per unit time required for the analog part in the present embodiment becomes approximately n times as compared with the conventional art, because n channels simultaneously operate in the RW channels in the present embodiment. On the other hand, the data processing quantity per unit time per channel in the modulation-demodulation circuit and the error detection/correction circuit becomes proportional to the number of rotations of the disc and becomes 1/n. In the present embodiment, however, n channels operate simultaneously. When viewed as the information recording and reproducing apparatus as a whole, therefore, the effect is canceled and consequently the data processing quantity per unit time per channel in the modulation-demodulation circuit and the error detection/correction circuit becomes approximately one time.

As for the data processing quantity per unit time concerning the buffer memory control as well among various kinds of processing concerning the periphery of the host interface, the processing quantity per channel in the present embodiment becomes proportional to the number of rotations of the disc and becomes 1/n. In the present embodiment, however, n channels operate simultaneously. When viewed as the information recording and reproducing apparatus as a whole, therefore, the effect is canceled and consequently the processing quantity per channel in the present embodiment becomes approximately one time. As for the data processing quantity per unit time required for data distribution, the function block is not necessary in the conventional art whereas the necessity for newly conducting processing occurs in the present embodiment. In the present embodiment, therefore, power dissipation is increased because of the function block. The data processing quantity per unit time required for processing of a command issued by the host remains approximately one time in both the conventional art and the present embodiment, because the interface is limited to one in number. The data processing quantity per unit time required for transfer of data reproduced or to be recorded does not change in both the conventional art and the present embodiment, and consequently it becomes approximately one time in both the conventional art and the present embodiment.

Summarizing the foregoing description, therefore, the data processing quantity concerning the SPM control processing in the present embodiment can be reduced remarkably as compared with the conventional art, and power dissipation required for the SPM drive and the SPM control processing/drive can be reduced. On the other hand, in function blocks of fine adjustment actuator positioning processing/drive, analog system recording and reproducing signal processing and data distribution/alignment processing, the data processing quantity per unit time or the number of simultaneously operating circuits in the present embodiment increase as compared with the conventional art. In the present embodiment, power dissipation caused by these function blocks increases as compared with the conventional art. As for logic circuits concerning various kinds of data processing, however, power dissipation can be basically reduced owing to their finer circuit manufacture process. The ratio of their power dissipation in the whole information recording and reproducing apparatus can be expected to reduce in the future. And the fine adjustment actuators are small in movable range and the ratio of their power dissipation in the whole information recording and reproducing apparatus is extremely small. Therefore, it can be expected that the present embodiment will become more advantageous in the future as compared with the conventional art as regards the power dissipation.

As heretofore described, the present invention makes it possible to reduce energy dissipation caused by the mechanism system such as the SPM which rotates the recording media and the VCM which moves the heads mounting the recording and reproducing elements, while maintaining the consecutive data transfer rate at the time of sequential access, and makes it possible to implement power saving of the information recording and reproducing apparatus itself or the information recording and reproducing system using the information recording and reproducing apparatus. In other words, even when increasing the consecutive data transfer rate at the time of sequential access to n times as compared with the case where only one information recording and reproducing apparatus according to the conventional art is used, only one information recording and reproducing apparatus according to the present embodiment is needed in the present embodiment. Therefore, the present embodiment has an advantage that the access processing capability per unit power dissipation can be improved remarkably.

Even when keeping the consecutive data transfer rate at the time of sequential access in the present embodiment equal to that in the case where only one information recording and reproducing apparatus according to the conventional art is used, the present embodiment has an advantage that the access processing capability per unit power dissipation can be improved remarkably supposing a decrease of energy dissipation of semiconductor itself owing to a finer semiconductor working process, because energy dissipation caused by the mechanism system such as the SPM and the VCM can be reduced.

In addition, in the present embodiment, the rotation of the recording media is not stopped basically unlike the MAID (Massive Arrays of Inactive Disks) technique. Therefore, the spin up time of the information recording and reproducing apparatus is not added to the access latency. As a result, access performance fall and consequent fall of the system operation efficiency fall are not caused. In addition, it becomes unnecessary to use a large-capacity buffer formed of a semiconductor memory or the like together as a measure for preventing the access performance from falling. In addition, since a remarkable increase of current dissipation of the information recording and reproducing apparatus caused by frequent spin up is eliminated, it becomes unnecessary to ensure a large output capacity of the power supply in preparation therefore. For these reasons, the present embodiment becomes extremely advantageous in respects of the access performance, cost and installation size of the information recording system as well. Furthermore, since the spin up and spin down of the drive do not basically increase, a tri-pological problem between the heads and the recording media is not apt to occur. Therefore, the present embodiment becomes extremely advantageous in the respect of the reliability of the information recording system as well.

As heretofore described, the present embodiment is capable of implementing the power saving of the information recording and reproducing apparatus and improving the access processing performance per dissipated power without hampering its access performance, especially its sequential access performance to the utmost.

Heretofore, the embodiment of the present invention has been described. However, the present invention is not limited to the above-described embodiment, but it is a matter of course that various modifications are possible to those skilled in the art.

For example, in the embodiment, the recording media 2 have been exemplified as recording media. However, they are not restrictive, but strip-shaped, cylindrical or columnar recording media may also be used. Furthermore, in the embodiment, circular tracks have been exemplified as tracks formed on the recording surfaces of the recording media. However, they are not restrictive, but spiral-shaped tracks may be used. In the embodiment, the recording scheme has been the magnetic recording. However, this is not restrictive, but the thermal assisted magnetic recording or the optical recording may also be used.

In the embodiment, an information recording and reproducing apparatus capable of conducting both data recording and data reproducing has been used. However, the recording processing function may be omitted from the configuration and the apparatus may be configured as an information reproducing apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording and reproducing apparatus, for use with a recording medium with recorded information on predetermined tracks formed on a plurality of recording surfaces, the information recording and reproducing apparatus comprising:
   a plurality of heads, each head provided for an associated recording surface, the head configured to move in a direction along a predetermined track;
   a first actuator for coarse adjustment, configured to support the heads, move the heads uniformly, and cause the heads to approach their predetermined tracks, the first actuator including a single voice coil motor (VCM) and a plurality of individual arms coupled to the VCM, each individual arm provided for an associated head and configured to move in accordance with driving by the VCM;
   a plurality of second actuators for fine adjustment, each second actuator provided for an associated head, disposed between the associated head and an associated arm, adapted to support the associated head, configured to move the associated head independently relative to the first actuator, and configured to move independently of the associated arm so as to suppress deviations of the head from the predetermined track;
   a plurality of recording processing circuits configured to simultaneously output recording signals which represent information to be recorded on the predetermined tracks to the heads;
   a plurality of reproducing processing circuits configured to be simultaneously supplied with reproduced signals read out from the predetermined tracks by the heads, the reproducing processing circuits configured to reproduce information from the reproduced signals; and
   a temporary storage unit configured to store at least $(c-1) \times d+1$ information units, wherein c is the total number of the heads, and d is the predetermined number;
   wherein a plurality of recording units forming the predetermined tracks are configured to be divided into sets in which recording units approached simultaneously by the heads continue by a predetermined number less than the number of recording units forming each of the predetermined tracks, and wherein a plurality of recording units belonging to each of the sets are configured to be associated with serial numbers each representing a recording position of an information unit, in order of the serial number.

2. The information recording and reproducing apparatus according to claim 1, wherein the first actuator is configured to cause the heads to approach the predetermined tracks on the basis of an average deviation of the heads from the predetermined tracks.

3. The information recording and reproducing apparatus according to claim 1, further comprising a spindle motor configured to rotate the recording media formed so as to each take a disc shape around a common rotation shaft.

4. The information recording and reproducing apparatus according to claim 1, wherein a plurality of circular tracks are formed around the rotation shaft on the recording surfaces of the recording media, so as to each take a disc shape, and wherein the circular tracks formed on the recording surfaces, which are common in radius position, are used as the predetermined tracks.

5. The information recording and reproducing apparatus according to claim 1, wherein a plurality of circular tracks are formed around the rotation shaft on the recording surfaces of the recording media formed so as to each take a disc shape, and wherein servo information is recorded at a common circumferential position on the circular tracks formed on the recording surfaces.

6. The information recording and reproducing apparatus according to claim 1, wherein the recording processing circuits are configured to distribute information units, which are successively input to the heads by a predetermined number which is less than the number of recording units forming each of the predetermined tracks.

7. The information recording and reproducing apparatus according to claim 1, wherein the recording processing circuits are configured to distribute information units which are associated with serial numbers and which are input, in order of the serial number, to the heads by a predetermined number which has consecutive serial numbers and which is less than the number of recording units forming each of the predetermined tracks.

8. The information recording and reproducing apparatus according to claim 1, wherein whenever the heads read out information units from a predetermined number of consecutive recording units among the recording units forming the predetermined tracks, and the predetermined number is less than the number of recording units forming each of the predetermined tracks, the reproducing processing circuits are configured to rearrange the information units in order of serial numbers associated with the information units and output the rearranged information units.

9. The information recording and reproducing apparatus according to claim 1, wherein a plurality of information units associated with serial numbers are rearranged to a sequence of sets of information units to be recorded in recording units approached simultaneously by the heads among recording units forming the predetermined tracks, and input from an external apparatus, and wherein the recording processing circuits are configured to distribute the information units which are input as the sequence of sets, to the heads.

10. The information recording and reproducing apparatus according to claim 1, wherein the reproducing processing circuits output information units are configured to successively read out from recording units forming each of the predetermined tracks by the heads to an external apparatus, and wherein the external apparatus is configured to rearrange the information units in order of serial numbers associated with the information units.

11. An information recording and reproducing system, for use with a recording medium with recorded information on predetermined tracks formed on a plurality of recording surfaces, the information recording and reproducing system comprising:

an information recording and reproducing apparatus including:

a plurality of heads, each head provided for an associated recording surface, the head is configured to move in a direction along a predetermined track, a first actuator for coarse adjustment, configured to support the heads, move the heads uniformly, and cause the heads to approach their predetermined tracks, the first actuator including a single voice coil motor (VCM) and a plurality of individual arms coupled to the VCM, each individual arm provided for an associated head and configured to move in accordance with driving by the VCM, a plurality of second actuators for fine adjustment, each second actuator provided for an associated head, disposed between the associated head and an associated arm, adapted to support the associated head, configured to move the associated head independently relative to the first actuator, and configured to move independently of the associated arm so as to suppress deviations of the head from the predetermined track; and a plurality of recording processing circuits configured to simultaneously output recording signals which represent information to be recorded on the predetermined tracks to the heads, a plurality of reproducing processing circuits configured to be simultaneously supplied with reproduced signals read out from the predetermined tracks by the heads, the reproducing processing circuits configured to reproduce information from the reproduced signals, and a temporary storage unit configured to store at least $(c-1) \times d+1$ information units, wherein c is the total number of the heads, and d is the predetermined number;

an information processing apparatus for transmitting information to be recorded on the recording media to the information recording and reproducing apparatus and receiving information reproduced from the recording media from the information recording and reproducing apparatus, wherein the information processing apparatus is configured to rearrange information units associated with serial numbers to a sequence of sets of information units to be recorded in recording units approached simultaneously by the heads among recording units forming the predetermined tracks, and is configured to transmit the rearranged information units to the information recording and reproducing apparatus; and wherein the recording processing circuits in the information recording and reproducing apparatus distribute the information units which are input as the sequence of sets, to the heads;

wherein a plurality of recording units forming the predetermined tracks are configured to be divided into sets in which recording units approached simultaneously by the heads continue by a predetermined number less than the number of recording units forming each of the predetermined tracks, and wherein a plurality of recording units belonging to each of the sets are configured to be associated with serial numbers each representing a recording position of an information unit, in order of the serial number.

12. The information recording and reproducing system according to claim 11, wherein the reproducing processing circuits in the information processing apparatus output information units are configured to successively read out from the recording units forming each of the predetermined tracks by the heads to the information processing apparatus; and wherein the information processing apparatus is configured to rearrange the information units in order of serial numbers associated with the information units.

13. The information recording and reproducing system according to claim 11, wherein a plurality of circular tracks are formed around the rotation shaft on the recording surfaces of the recording media, so as to each take a disc shape, and wherein the circular tracks formed on the recording surfaces, which are common in radius position, are used as the predetermined tracks.

14. An information processing apparatus, provided for an information recording and reproducing apparatus for use with one or more recording media having information recorded on predetermined tracks formed on each of a plurality of recording surfaces, the information processing apparatus comprising:

wherein the information recording and reproducing apparatus includes:

a plurality of heads, each head provided for an associated recording surface, the head configured to move in a direction along a predetermined track, a first actuator for coarse adjustment, configured to support the heads, move the heads uniformly, and cause the heads to approach their predetermined tracks, the first actuator including a single voice coil motor (VCM) and a plurality of individual arms coupled to the VCM, each individual arm provided for an associated head and configured to move in accordance with driving by the VCM, a plurality of second actuators for fine adjustment, each second actuator provided for an associated head, disposed between the associated head and an associated arm, adapted to support the associated head, configured to move the associated head independently relative to the first actuator, and configured to move independently of the associated arm so as to suppress deviations of the head from the predetermined track, a plurality of recording processing circuits configured to simultaneously output recording signals which represent information to be recorded on the predetermined tracks to the heads, and reproducing processing circuits configured to be simultaneously supplied with reproduced signals read out from the predetermined tracks by the heads, the reproducing processing circuits configured to reproduce information from the reproduced signals, and a temporary storage unit configured to store at least $(c-1) \times d+1$ information units, wherein c is the total number of the heads, and d is the predetermined number;

wherein the information processing apparatus is configured to rearrange information units associated with serial numbers to a sequence of sets of information units to be recorded in recording units approached simultaneously by the heads among recording units forming the predetermined tracks, and is configured to transmit the rearranged information units to the information recording and reproducing apparatus;

wherein a plurality of recording units forming the predetermined tracks are configured to be divided into sets in which recording units approached simultaneously by the heads continue by a predetermined number less than the number of recording units forming each of the predetermined tracks, and wherein a plurality of recording units belonging to each of the sets are configured to be associated with serial numbers each representing a recording position of an information unit, in order of the serial number.

15. The information processing apparatus according to claim 14, wherein the information processing apparatus is configured to receive information units successively read out from the recording units forming each of the predetermined tracks by the heads; and wherein the information processing apparatus is configured to rearrange the information units in order of serial numbers associated with the information units.

16. The information processing apparatus according to claim 14, wherein a plurality of circular tracks are formed around the rotation shaft on the recording surfaces of the recording media, so as to each take a disc shape, and wherein the circular tracks formed on the recording surfaces, which are common in radius position, are used as the predetermined tracks.

17. An information reproducing apparatus, for use with one or more recording media, each media having information recorded on predetermined tracks formed on each of a plurality of recording surfaces, the information reproducing apparatus comprising:

a plurality of heads, each head provided for an associated recording surface, the head configured to move in a direction along a predetermined track;

a first actuator for coarse adjustment, configured to support the heads, move the heads uniformly, and cause the heads to approach their predetermined tracks, the first actuator including a single voice coil motor (VCM) and a plurality of individual arms coupled to the VCM, each individual arm provided for an associated head and configured to move in accordance with driving by the VCM;

a plurality of second actuators for fine adjustment, each second actuator provided for an associated head, disposed between the associated head and an associated arm, adapted to support the associated head, configured to move the associated head independently relative to the first actuator, and configured to move independently of the associated arm so as to suppress deviations of the head from the predetermined track;

reproducing processing circuits configured to be simultaneously supplied with reproduced signals read out from the predetermined tracks by the heads, the reproducing processing circuits configured to reproduce information from the reproduced signals; and a temporary storage unit configured to store at least $(c-1) \times d+1$ information units, wherein c is the total number of the heads, and d is the predetermined number;

wherein a plurality of recording units forming the predetermined tracks are configured to be divided into sets in which recording units approached simultaneously by the heads continue by a predetermined number less than the number of recording units forming each of the predetermined tracks, and wherein a plurality of recording units belonging to each of the sets are configured to be associated with serial numbers each representing a recording position of an information unit, in order of the serial number.

18. The information reproducing apparatus according to claim 17, wherein a plurality of circular tracks are formed around the rotation shaft on the recording surfaces of the recording media, so as to each take a disc shape, and wherein the circular tracks formed on the recording surfaces, which are common in radius position, are used as the predetermined tracks.

* * * * *